United States Patent
Smeeton

(10) Patent No.: US 11,048,295 B1
(45) Date of Patent: Jun. 29, 2021

(54) FLEXIBLE WINDOW FOR FOLDABLE DISPLAY

(71) Applicant: SHARP KABUSHIKI KAISHA, Sakai (JP)

(72) Inventor: Tim Michael Smeeton, Oxford (GB)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 16/739,582

(22) Filed: Jan. 10, 2020

(51) Int. Cl.
  *G06F 1/16* (2006.01)
  *G09F 9/30* (2006.01)

(52) U.S. Cl.
  CPC .......... *G06F 1/1609* (2013.01); *G06F 1/1626* (2013.01); *G06F 1/1652* (2013.01); *G09F 9/301* (2013.01)

(58) Field of Classification Search
  None
  See application file for complete search history.

(56) References Cited

U.S. PATENT DOCUMENTS

| | | | |
|---|---|---|---|
| 9,354,476 B2 * | 5/2016 | Han | G06F 1/1626 |
| 2013/0216740 A1 | 8/2013 | Russell-Clarke et al. | |
| 2014/0065326 A1 * | 3/2014 | Lee | G09F 9/301 |
| | | | 428/12 |
| 2015/0004334 A1 * | 1/2015 | Bae | B32B 37/182 |
| | | | 428/12 |
| 2019/0022980 A1 | 1/2019 | Chu et al. | |
| 2019/0265756 A1 * | 8/2019 | Jones | G06F 1/1652 |

* cited by examiner

*Primary Examiner* — Anthony Q Edwards
*Assistant Examiner* — Rashen E Morrison
(74) *Attorney, Agent, or Firm* — ScienBiziP, P.C.

(57) ABSTRACT

A cover window for a display device comprising a substrate, a joining layer and an outer cover, wherein the cover window has at least one folding region and at least one non-folding region. The substrate in the folding region has openings filled with at least a first filler material and a second filler material, wherein a stiffness of the first filler material is less than a stiffness of the second filler material, and the stiffness of the second filler material is less than a stiffness of the substrate.

19 Claims, 8 Drawing Sheets

FLEXIBLE WINDOW FOR FOLDABLE DISPLAY

FIELD

The present disclosure generally relates to displays, and in particular to structures of information displays, especially for use in mobile applications (e.g., cell phone, tablet computer, notebook computer, etc.). The structures are applicable to displays based on light emitting diodes (LED), for example, an organic LED (OLED) display.

BACKGROUND

An information display device may include a stack of layers, for example a matrix of OLEDs disposed on a substrate, a touch sensor, and an optical polarizer. These layers may be bonded together using adhesive layers. The display device may further be bonded to a cover window, which the light from the display is emitted through, with the cover window providing a physical protection of the layers in the display. The display may further be mounted into a housing, which typically supports the display and provides protection of the layers of the display on the surface opposite to the cover window and around the edges of the display.

Information display devices may be foldable such that their shapes are changed repeatedly during their use. For example, foldable displays may be bent or folded such that at least some part of the display has a curvature at times and is substantially flat at other times. For foldable displays, it is essential that the cover window can be deformed without failing (e.g., by cracking or yielding) and without requiring a substantial amount of force to cause the deformation. Typically, in order to meet these requirements, the window should be thin and/or comprised of a material with low stiffness. For example, polymer materials may make a suitable window film or glass windows with thickness below 100 μm (i.e., $10^{-6}$ meters) may be suitable. In display devices which are non-bendable (e.g., the shape of the display is not changed repeatedly during its use), it is common to use a relatively thick glass window (e.g., thickness of 400 μm to 700 μm).

Displays comprising thin cover windows or cover windows comprised of a material with low stiffness can be susceptible to damage during impact of an object onto the window of the display. Furthermore, thin or low stiffness cover windows can often adopt a wavy shape which gives an inferior appearance and user experience (e.g., for touch sensor operation) compared to the highly planer shape of the relatively thick glass cover windows. Therefore, a tradeoff arises between requirements for a cover window of a display, on one hand, good impact resistance and highly planar appearance, and on the other hand, suitable properties for foldability of the display.

United States Publication No. US2019/0265756A1 (Christopher D. Jones et al., published Aug. 29, 2019) describes a cover for a display in which the thickness of a ceramic material is reduced in local regions in the vicinity of a region of the display which will be bent or folded. A filler material may be added in the regions where the ceramic material thickness is reduced.

U.S. Pat. No. 9,354,476B2 (Soyeon Han et al., published May 31, 2016) describes a cover for a display in which holes are made in a cover material wherein the holes are extended along the entire direction perpendicular to the circumference of the folding circle path. A filler material may be added in the holes in the cover material.

United States Publication No. US2013/0216740A1 (Peter N. Russell-Clarke et al., published Aug. 22, 2013) describes structures for openings which may be made in a rigid material to provide a region which has a low resistance to bending or folding.

United States Publication No. US2019/0022980A (Polly Wanda Chu et al., published Jan. 24, 2019) describes a cover element for a foldable electronic device with a cover element comprising a glass element with a compressive stress region extending from a first surface to a first depth within the glass element.

CITATION LIST

U.S. Pub. No. US 2019/0265756A1 (Christopher D. Jones et al., published Aug. 29, 2019).

U.S. Pat. No. 9,354,476B2 (Soyeon Han et al., published May 31, 2016).

U.S. Pub. No. US2013/0216740A1 (Peter N. Russell-Clarke et al., published Aug. 22, 2013).

U.S. Pub. No. US2019/0022980A1 (Polly Wanda Chu et al., published Jan. 24, 2019).

SUMMARY

The present disclosure is directed to a flexible cover window for a foldable display.

In accordance with one aspect of the present disclosure, a cover window for a display device comprises an outer cover layer, a substrate having a plurality of openings in a folding region of the cover window, and a joining layer adjoining the outer cover layer and the substrate, where at least one of the plurality of openings extends through an entire thickness of the substrate, and is filled with a first filler material having a first stiffness and a second filler material having a second stiffness, and where the first stiffness is less than the second stiffness, and the second stiffness is less than a stiffness of the substrate.

In some implementation, the substrate is disposed on a display layer of the display device, the first filler material enables easy bending of the cover window, and the second filler material provides protection of the display layer during impact on the outer cover layer of the folding region.

In some implementation, at least one of the first filler material and the second filler material includes at least one of elastomers, acrylic resin, and ultraviolet (UV) curable optical adhesives.

In some implementation, the first filler material and the second filler material fill an entire space of the at least one of the plurality of openings.

In some implementation, the first filler material fills 50%-90% of the entire thickness of the substrate.

In some implementation, the second filler material fills 10%-50% of the entire thickness of the substrate.

In some implementation, the joining layer has a stiffness higher than the first stiffness of the first filler material.

In some implementation, the first filler material has a first refractive index for a wavelength of visible light, the second filler material has a second refractive index for the wavelength of visible light, and each of the first and second refractive indices is within ±10% of a refractive index of the substrate for the wavelength of visible light.

In some implementation, the first filler material has a first dielectric constant, the second filler material has a second dielectric constant, and a weighted average of the first and second dielectric constants is within ±20% of a dielectric constant of the substrate, the weighted average is weighted by a ratio of a volume of the first filler material and a volume the second filler material.

In some implementation, the at least one of the plurality of openings is further filled with a third filler material having a third stiffness, and the third stiffness is less than the second stiffness.

In some implementation, the second material is disposed between the first filler material and the third filler material in the at least one of the plurality of openings.

In some implementation, the folding region includes an inward folding region and an outward folding region, the plurality of openings includes a plurality of inward folding openings in the inward folding region and a plurality of outward folding openings in the outward folding region, each of the plurality of inward folding openings includes the first filler material disposed on the second filler material, and each of the plurality of outward folding openings includes the second filler material disposed on the first filler material.

In some implementation, the display device comprises a closed state in which the folding region of the cover window has a first curvature, and an open state in which the folding region of the cover window has a second curvature, and the second filler material is configured to have zero stress in a third curvature between the first curvature and the second curvature.

In some implementation, at least one of the plurality of openings in the substrate does not terminate with vertices with angles less than 90°.

In some implementation, the first filler material comprises a nanoporous structure to facilitate compressibility of the first filler material when a curvature is applied.

In accordance with another aspect of the present disclosure, a display device comprises a display layer and a cover window for the display layer, where the cover window comprises an outer cover layer and a substrate having a plurality of openings in a folding region of the cover window, where at least one of the plurality of openings extends through an entire thickness of the substrate, and is filled with a first filler material having a first stiffness and a second filler material having a second stiffness different from the first stiffness.

In some implementation, the first stiffness is less than the second stiffness, and the second stiffness is less than a stiffness of the substrate.

In some implementation, at least one of the first filler material and the second filler material includes at least one of elastomers, acrylic resin. and ultraviolet (UV) curable optical adhesives.

In some implementation, the first filler material has a first refractive index for a wavelength of visible light, the second filler material has a second refractive index for the wavelength of visible light, and each of the first and second refractive indices is within ±10% of a refractive index of the substrate for the wavelength of visible light.

In some implementation, the first filler material has a first dielectric constant, the second filler material has a second dielectric constant, and a weighted average of the first and second dielectric constants is within ±20% of a dielectric constant of the substrate, the weighted average is weighted by a ratio of a volume of the first filler material and a volume the second filler material.

BRIEF DESCRIPTION OF DRAWINGS

Aspects of the example disclosure are best understood from the following detailed description when read with the accompanying figures. Various features are not drawn to scale. Dimensions of various features may be arbitrarily increased or reduced for clarity of discussion.

DETAILED DESCRIPTION

Figure 1A:
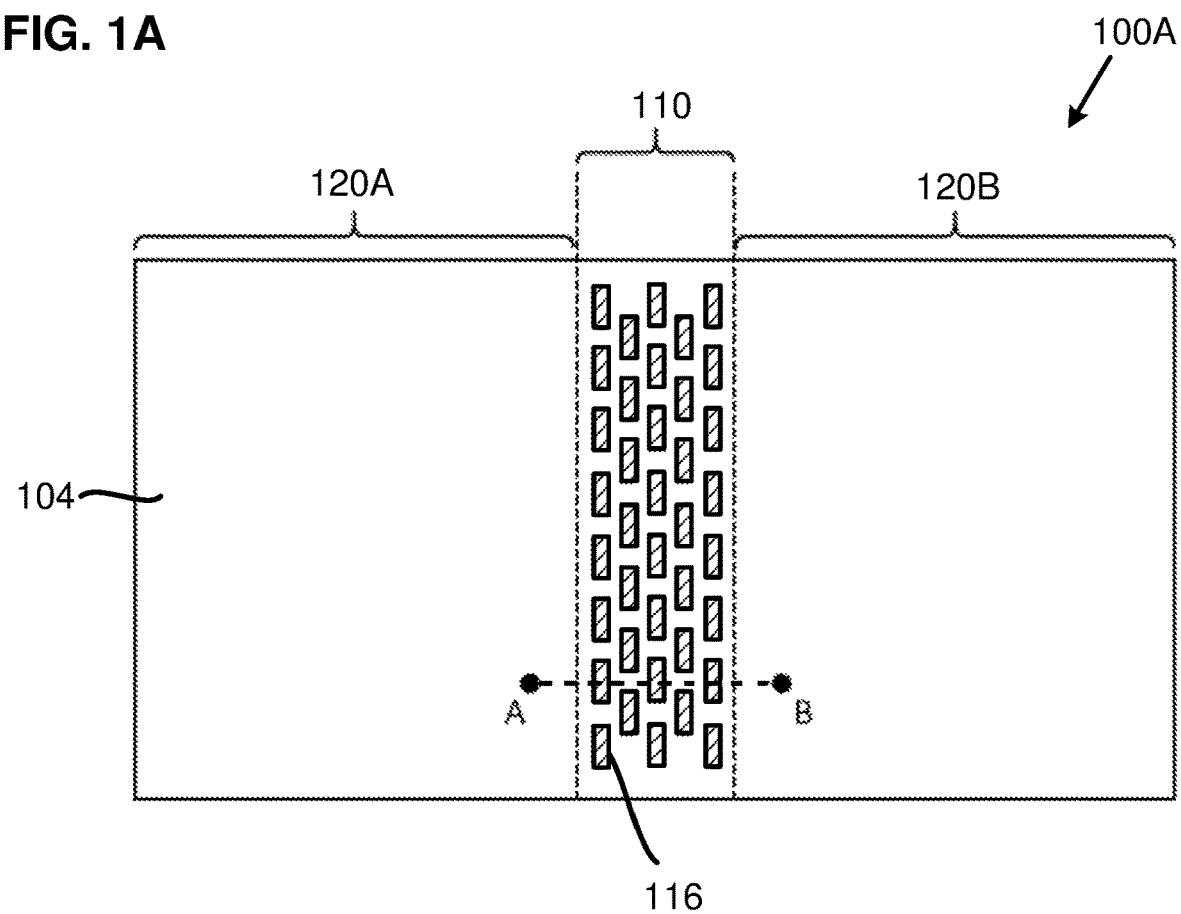
FIG. 1A is a schematic top plan view of a display device including one folding region with openings and two non-folding regions in accordance with an example implementation of the present disclosure.

The following description contains specific information pertaining to example implementations in the present disclosure. The drawings in the present disclosure and their accompanying detailed description are directed to merely example implementations. However, the present disclosure is not limited to merely these example implementations. Other variations and implementations of the present disclosure will occur to those skilled in the art. Unless noted otherwise, like or corresponding elements among the figures may be indicated by like or corresponding reference numerals. Moreover, the drawings and illustrations in the present disclosure are generally not to scale, and are not intended to correspond to actual relative dimensions.

For the purpose of consistency and ease of understanding, like features may be identified (although, in some examples, not shown) by the same numerals in the example figures. However, the features in different implementations may be differed in other respects, and thus shall not be narrowly confined to what is shown in the figures.

The description uses the phrases "in one implementation," or "in some implementations," which may each refer to one or more of the same or different implementations. The term "comprising," when utilized, means "including, but not necessarily limited to"; it specifically indicates open-ended inclusion or membership in the so-described combination, group, series and the equivalent. The expression "at least one of A, B and C" or "at least one of the following: A, B and C" means "only A, or only B, or only C, or any combination of A, B and C."

Additionally, for the purposes of explanation and non-limitation, specific details, such as functional entities, techniques, protocols, standard, and the like are set forth for providing an understanding of the described technology. In other examples, detailed description of well-known methods, technologies, systems, architectures, and the like are omitted so as not to obscure the description with unnecessary details.

FIG. 1A is a schematic top plan view of an example structure 100A of a display device including one folding region and two non-folding regions in accordance with an example implementation of the present disclosure. In FIG. 1A, the example structure 100A of the display device includes a folding region 110 between a first non-folding region 120A and a second non-folding region 120B. The folding region 110 includes a plurality of openings 116 in a substrate 104 of the display device. The display device may also include a joining layer 106, an outer cover layer 108, a display layer 118, and an adhesive layer 122 (as shown in FIGS. 1B through 1F).

Figure 1B:
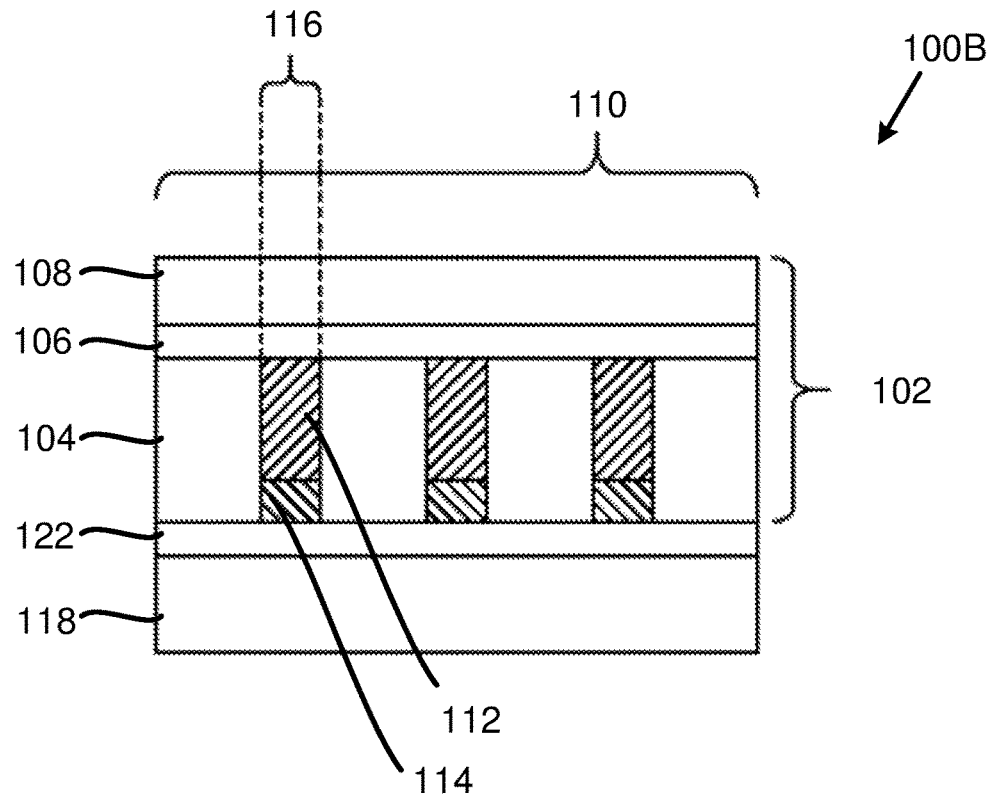
FIG. 1B is a schematic cross-sectional view of the folding region of the display device corresponding to the line A-B in FIG. 1A in a non-folding state in accordance with an example implementation of the present disclosure.

FIG. 1B is a schematic cross-sectional view of an example structure 100B of the folding region of the display device corresponding to the line A-B in FIG. 1A in a non-folding (e.g., open) state in accordance with an example implementation of the present disclosure. As shown in FIG. 1B, the example structure 100B of the folding region 110 of the display device includes a cover window 102 over the display layer 118. The cover window 102 comprises the substrate 104, the joining layer 106, and the outer cover layer 108.

Figure 1C:
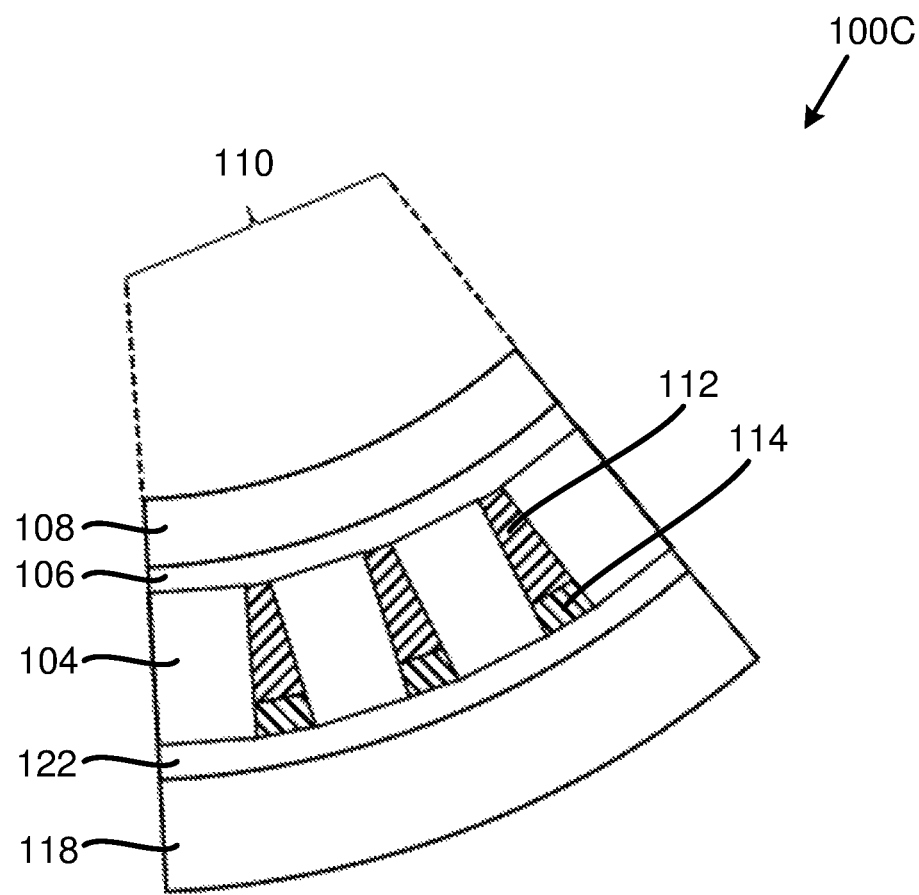
FIG. 1C is a schematic cross-sectional view of the folding region of the display device in FIG. 1B when a curvature is applied to the folding region in accordance with an example implementation of the present disclosure.
Figure 1D:
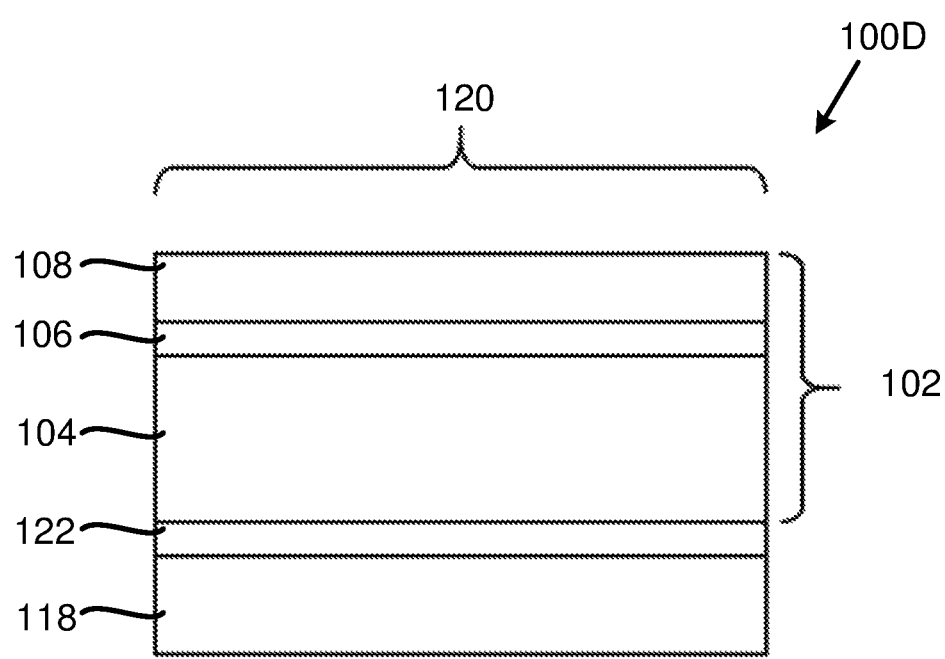
FIG. 1D is a schematic cross-sectional view of a non-folding region of the display device in accordance with an example implementation of the present disclosure.
Figure 1E:
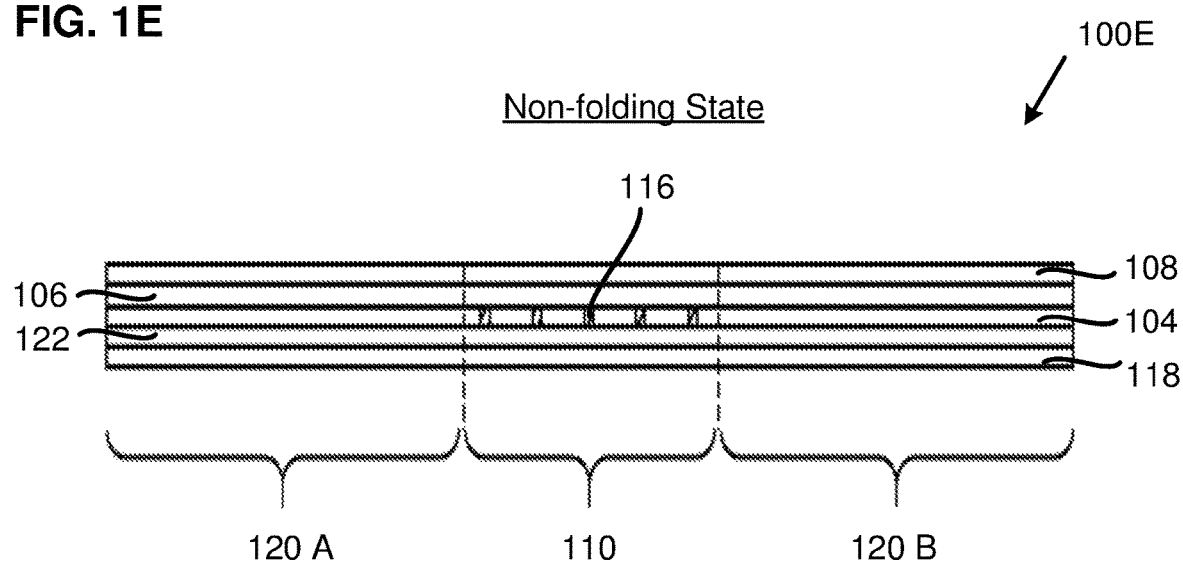
FIG. 1E illustrates a schematic diagram of the display device in a non-folding state in accordance with an example implementation of the present disclosure.
Figure 1F:
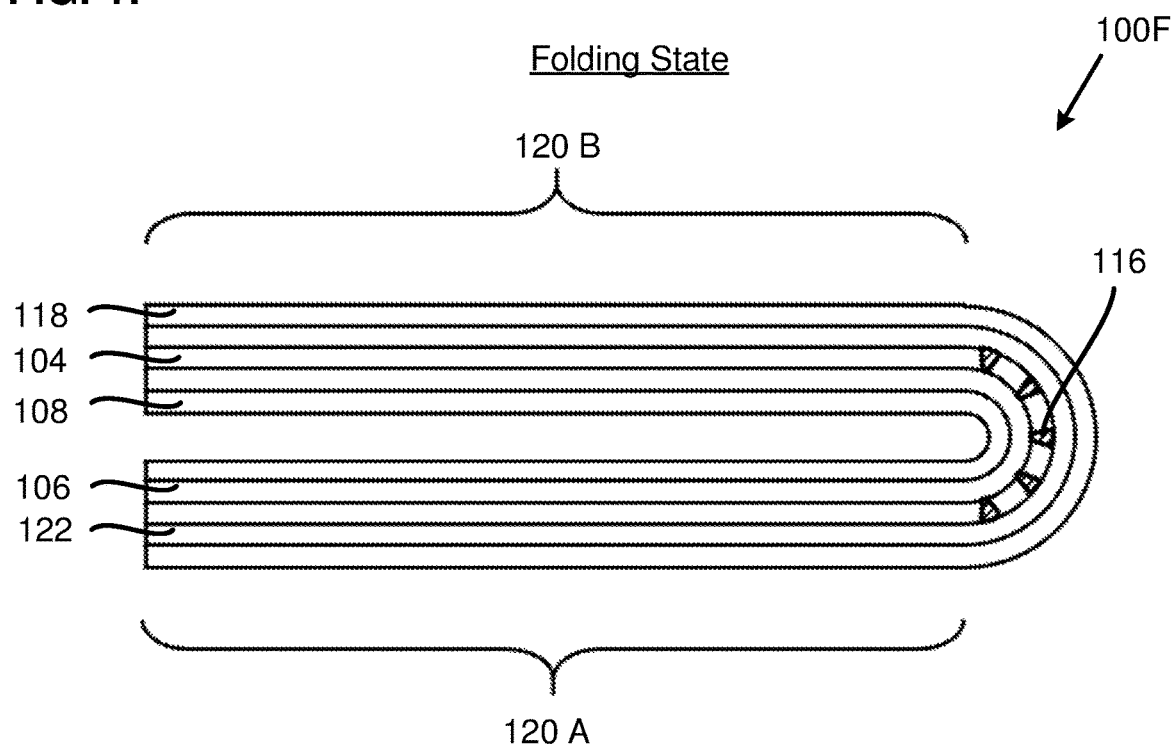
FIG. 1F illustrates a schematic diagram of the display device in a folding state in accordance with an example implementation of the present disclosure.

In the present implementation, the cover window 102 covers both the folding region 110 and the non-folding regions 120A and 120B (as shown in FIGS. 1E and 1F). The folding region 110 may be a hinge region of the foldable display. At least one of the non-folding regions 120A and 120B may be a planar region of the foldable display. In the present implementation, the cover window 102 comprises the substrate 104 of a stiff material (e.g., glass having a thickness of approximately 400 µm). The joining layer 106 may be an optically clear adhesive (OCA). The outer cover layer 108 may be an ultrathin glass having a thickness of approximately 50 µm.

As shown in FIG. 1B, in the folding region 110, the substrate 104 may comprise the plurality of openings 116 in which the substrate material is removed through the entire thickness of the substrate 104. In the present implementation, the openings 116 may be filled with at least a first filler material 112 and a second filler material 114.

In the present implementation, as shown in FIG. 1A, the substrate 104 is continuous. In another implementation, the substrate 104 may be discontinuous. In the present implementation, the outer cover layer 108 is continuous over the entire area of the cover window 102 (e.g., in both folding region 110 and non-folding regions 120A and 120B in FIGS. 1E and 1F). As shown in FIG. 1B, the substrate side of the cover window 102 may be attached to the display layer 118, for example, by the adhesive layer 122. The display layer 118 may comprise at least a display substrate (not explicitly shown). The display layer 118 may include, but is not limited to, for example, an organic light emitting diode (OLED) display, a quantum dot light emitting diode (QLED, QD-LED) display operating by electroluminescence or a micro-LED display. The LED comprising pixels of the display may be operable as an active matrix display by way of a thin film transistor (TFT) backplane. The display layer 118 may further include at least one of a touch sensor (e.g., projected capacitive type touch sensor, not shown) and an optical polarizer (e.g., circular polarizer, not shown) which may be joined to each other and to the display substrate by adhesive layers. In a preferred example implementation of the present disclosure, the configuration of the display device may be the display substrate, the touch sensor, the optical polarizer, and the cover window.

In one or more implementations of the present disclosure, each opening 116 in the substrate 104 is filled with at least two different filler materials. The first filler material 112 and the second filler material 114 may both have high optical transparency and have refractive indices similar to or the same as the refractive index of the material of the substrate 104 for any given wavelength of visible light. In one or more implementations of the present disclosure, the refractive index of the first filler material 112 for a given wavelength of visible light and the refractive index of the second filler material 114 for the given wavelength of visible light are preferably within ±10% of the refractive index of the substrate 104 for the given wavelength of visible light such that light emitted from the display layer 118 is not substantially scattered as it propagates through the substrate 104 or the filler materials. In one or more implementations of the present disclosure, the refractive index of the substrate 104 (e.g., glass, etc.) for any given wavelength of visible light may be between 1.4 and 1.6, preferably between 1.45 and 1.55, and typically has a value of approximately 1.5.

In one or more implementations of the present disclosure, the first filler material 112 and the second filler material 114 may have different mechanical stiffness. In a preferred example implementation, the stiffness of the first filler material 112 is less than the stiffness of the second filler material 114. For example, low stiffness in the first filler material 112 enables relatively easy bending of the cover window 102, while higher stiffness in the second filler material 114 provides improved protection of the display layer 118 during impact of an object or stylus on the outer cover layer 108 of the folding region 110. In general, the stiffness of each of the first filler material 112 and the second filler material 114 is less than the stiffness of the substrate 104.

In one or more implementations of the present disclosure, the first filler material 112 may have a Young's Modulus (e.g., stiffness) between 10 kPa and 100 MPa, preferably between 20 kPa and 1 MPa, and the second filler material 114 may have a Young's Modulus between 10 MPa and 50 GPa, preferably between 100 MPa and 5 GPa. The stiffness of the filler materials may depend strongly on temperature. The example values provided herein refer to exemplary stiffness at room temperature (approximately +25° C.). Preferably, the Young's modulus of the first and second filler materials 112 and 114 remain within the ranges provided above for any temperature between −20° C. and +60° C., but is not limited to the example values provided herein. In one or more implementations of the present disclosure, the first and second filler materials 112 and 114 may be made from any suitable material(s) such as elastomers, acrylic resin, and UV curable optical adhesives.

In one or more implementations of the present disclosure, the substrate 104 is preferably a material with high stiffness compared to the first and second filler materials 112 and 114. In one or more implementations of the present disclosure, the substrate 104, for example, may be a chemically strengthened glass with a Young's modulus (e.g., stiffness) of more than 50 GPa. A typical value of the Young's modulus may be between 70 GPa and 80 GPa, for example, approximately 75 GPa. The substrate 104 having high stiffness and thickness in the range between 200 µm and 600 µm may be effective in protecting the display layer 118 from damage that may be caused by impact of an object on the outer cover layer 108, or from a stylus contacting the outer cover layer 108. Specifically, the substrate 104 is effective at spreading the force of an impact or stylus over a relatively wide area of the outer cover layer 108 (e.g., area(s) in a plane perpendicular to the direction of impact) such that damage to an element in the display layer 118 may be prevented for a given impact or force, for example from a stylus, either in the folding region 110 or in the non-folding regions 120A and 120B.

In one or more implementations of the present disclosure, the thickness of the substrate 104 is preferably between 200 µm and 600 µm. The thickness of the first filler material 112 may be about 50% to 90% of the thickness of the substrate 104. The thickness of the second filler material 114 may be about 10% to 50% of the thickness of the substrate 104.

In one or more implementations of the present disclosure, the outer cover layer 108 may be made from any suitable material(s). The outer cover layer 108 is preferably made from a material with high stiffness and low thickness such that the outer cover layer 108 can be bent or folded by a relatively small force. For example, the outer cover layer 108 may be a chemically strengthened glass with thickness less than 100 µm, preferably more than 20 µm, and preferably about 40-70 µm. In another example implementation, the outer cover layer 108 may be made from a polymer material, for example, a polyimide. Among other advantages, the outer cover layer 108 comprising a polyimide material may provide a low resistance to folding. Also, when joined by the joining layer 106 to the substrate 104, the outer cover layer 108 comprising the polyimide material provides a flat and smooth appearance and resistance to deformation when contacted by a stylus. A hard coating layer (not explicitly shown) may be disposed on the surface of the outer cover layer 108 opposite from the surface with the joining layer 106. The hard coating layer may increase resistance of the outer cover layer 108 to scratches. The continuous outer cover layer 108 may provide a smooth surface without discontinuity in any folding region (e.g., folding region 110), non-folding region (e.g., non-folding regions 120A and 120B), or at the interface between a folding region and non-folding region. Accordingly, a smooth feel is provided when a finger or stylus is moving across the surface of the continuous outer cover layer 108. Among other advantages, the combination of the outer cover layer 108 with the joining layer 106 and substrate 104 enables the outer cover layer 108 to sustain substantially higher impact force without failing (e.g., cracking or yielding of the outer cover layer 108).

In one or more implementations of the present disclosure, the joining layer 106 preferably has a Young's modulus higher than the Young's modulus of the first filler material 112, for example, to prevent any significant swelling of the first filler material 112 into the joining layer 106 during bending, and therefore prevent any localized strain in the outer cover layer 108. The joining layer 106 may be configured to facilitate slip of the outer cover layer 108 relative to the substrate 104 when a curvature is applied (e.g., such that a first neutral axis is formed in the outer cover layer 108 and a second neutral axis is formed in the substrate 104).

FIG. 1C is a schematic cross-sectional view of the folding region of the display device in FIG. 1B when a curvature is applied to the folding region in accordance with an example implementation of the present disclosure. As shown in FIG. 1C, when a curvature is applied to the folding region 110 of the display device, the first filler material 112 and the second filler material 114 are readily deformed such that the curvature is formed with less stress in the substrate 104 as compared to a display that does not have any openings and filler materials in the openings.

FIG. 1D is a schematic cross-sectional of an example structure 100D of one of the non-folding regions of the display device in FIG. 1A in accordance with an example implementation of the present disclosure. As shown in FIG. 1D, the example structure 100D of the foldable display device includes the cover window 102 over the display layer 118. The cover window 102 comprises the substrate 104, the joining layer 106, and the outer cover layer 108. The substrate side of the cover window 102 may be attached to the display layer 118, for example, by the adhesive layer 122. It should be noted that the substrate 104, the joining layer 106, the outer cover layer 108, the display layer 118, and the adhesive layer 122 are identical to the ones shown and described with reference to FIG. 1B, the details of which are omitted for brevity. The non-folding region 120A of the foldable display device does not include any openings or filler materials in the substrate 104. It should be noted that the non-folding region 120B (as shown in FIG. 1A) may have substantially the same structure as the example structure 100D shown in FIG. 1D.

FIG. 1E illustrates a schematic diagram of an example structure 100E of the display device in a non-folding state. In FIG. 1E, the example structure 100E includes the display layer 118, the adhesive layer 122, the substrate 104 having openings 116 filled with filler materials (e.g., 112 and 114), the joining layer 106, and the outer cover layer 108. In the non-folding (e.g., open) state shown in FIG. 1E, for example, the non-folding regions 120A and 120B and the folding region 110 of the display device may be planar without curvatures.

FIG. 1F illustrates a schematic diagram of an example structure 100F of the display device in FIG. 1A in a folding (e.g., closed) state in accordance with an example implementation of the present disclosure. In the sample structure 100F of FIG. 1F, the display device is folded inwards to a "U" shape (e.g., concave with respect to the outer surface of the outer cover layer 108). In the folding state shown in FIG. 1F, the non-folding region 120B is folded 1800 (e.g., in a counter clockwise direction) towards the non-folding region 120A via the folding region 110 from the non-folding state. In another implementation, the display device may be folded such that an angle between the non-folding regions 120A and 120B is between 0 and 200°. In one example, the non-folding regions 120A and 120B may be folded toward each other beyond a "U" shape where the moving ends of the non-folding regions 120A and 120B away from the folding-region 110 may make contact with each other, for example, forming an aerofoil shape. In yet another implementation, the display device may be folded outwards (e.g., convex with respect to the outer surface of the outer cover layer 108). When the display device is folded outwards, the second filler material 114 may be disposed on the outer cover layer 108 side of the openings 116, and the first filler material 112 on the display layer 118 side of the openings 116.

Figure 2A:
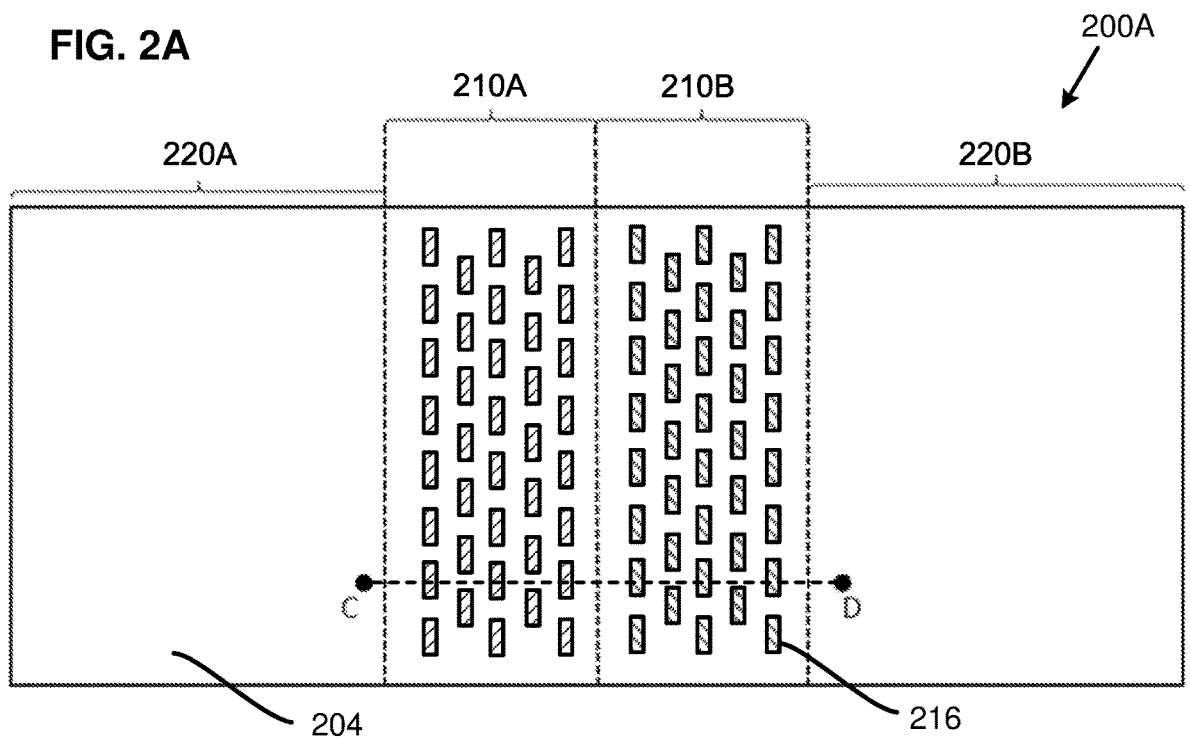
FIG. 2A is a schematic top plan view of a display device including a first folding region, a second folding region, and two non-folding regions in accordance with an example implementation of the present disclosure.

FIG. 2A is a schematic top plan view of an example structure 200A of a display device including two folding regions and two non-folding regions in accordance with an example implementation of the present disclosure. In FIG. 2A, the example structure 200A of the display device includes a first folding region 210A and a second folding region 210B between a first non-folding region 220A and a second non-folding region 220B. The first folding region 210A and the second folding region 210B each include a plurality of openings 216 in a substrate 204 of the display device. The shape and/or distribution of the openings 216 may be different in the first folding region 210A and the second folding region 210B. The display device may also include a cover window 202 having the substrate 204, a joining layer 206, and an outer cover layer 208, where the cover window 202 is disposed on a display layer 218 through an adhesive layer 222 (as shown in FIGS. 2B through 2E). It should be noted that the display layer 218, the adhesive layer 222, and the cover window 202 having the substrate 204, the joining layer 206, and the outer cover layer 208 described with reference to FIGS. 2A through 2E may substantially correspond to the display layer 118, the adhesive layer 122, and the cover window 102 having the substrate 104, the joining layer 106, and the outer cover layer 108, respectively, described with reference to FIGS. 1A through 1F. Thus, the details of the display layer 218, the adhesive layer 222, the cover window 202 including the substrate 204, the joining layer 206, and the outer cover layer 208 are omitted for brevity.

Figure 2B:
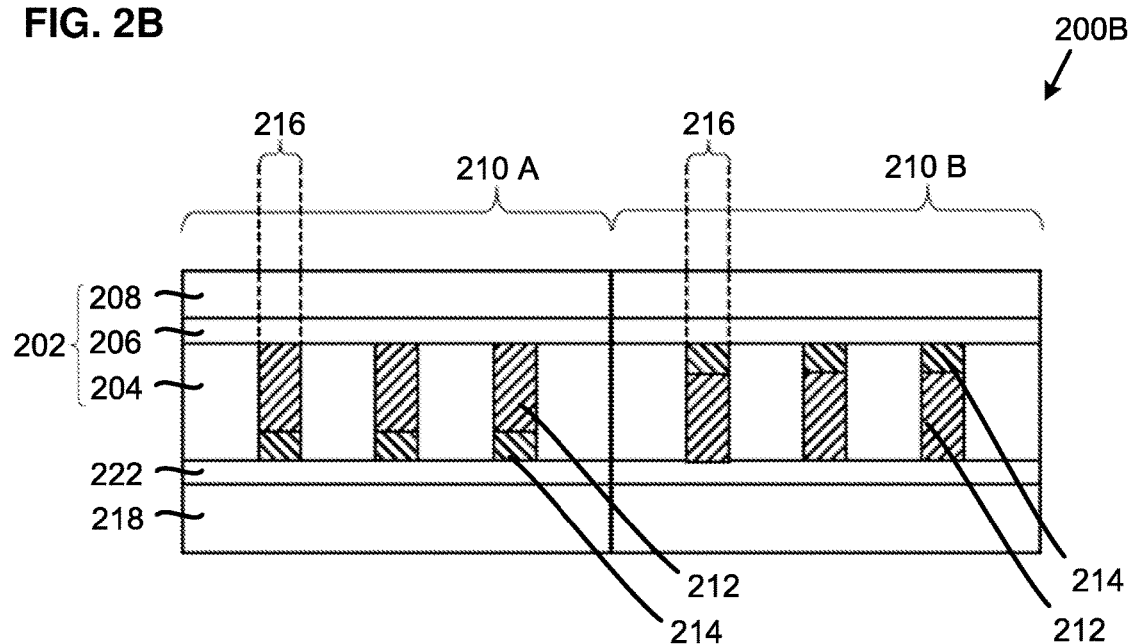
FIG. 2B is a schematic cross-sectional view of the first folding region and the second folding region corresponding to the line C-D in FIG. 2A in a non-folding state in accordance with an example implementation of the present disclosure.

FIG. 2B is a schematic cross-sectional view of an example structure 200B of the first and second folding regions of the display device corresponding to the line C-D in FIG. 2A in a non-folding (e.g., open) state in accordance with an example implementation of the present disclosure. As shown in FIG. 2B, the example structure 200B of the display device includes the first folding region 210A and the second folding region 210B each having a plurality of openings 216 in the substrate 204. In one or more implementations of the present disclosure, each opening 216 in the substrate 204 is filled with at least two different filler materials, for example, a first filler material 212 and a second filler material 214. The first filler material 212 and the second filler material 214 described with reference to FIGS. 2A through 2E may be substantially the same as the first filler material 112 and the second filler material 114 described with reference to FIGS. 1A through 1F. Thus, the details (e.g., the optical transparency, refractive index, Young's Modulus (e.g., stiffness), suitable material, etc.) of the first filler material 212 and the second filler material 214 are omitted for brevity.

As shown in FIG. 2B, the openings 216 in the first folding region 210A and the second folding region 210B may be filled with different filler materials and the distribution of the filler materials within the openings 216 in the first folding region 210A and in the second folding region 210B may be different. In the present implementation, in the first folding region 210A, the second filler material 214 may be disposed on the interface between the adhesive layer 222 and the substrate in the openings 216, and the first filler material 212 may be disposed on the second filler material 214 in the openings 216. In the second folding region 210B, the first filler material 212 may be disposed on the interface between the adhesive layer 222 and the substrate in the openings 216, and the second filler material 214 may be disposed on the first filler material 212 in the openings 216. With the present implementation, the first folding region 210A may be configured to fold inwards, and the second folding region 220B may be configured to fold outwards, as shown in FIGS. 2C and 2E.

In one or more implementations of the present disclosure, the thickness of the substrate 204 is preferably between 200 μm and 600 μm. The thickness of the first filler material 212 may be about 50% to 90% of the thickness of the substrate 204. The thickness of the second filler material 214 may be about 10% to 50% of the thickness of the substrate 204.

Figure 2C:
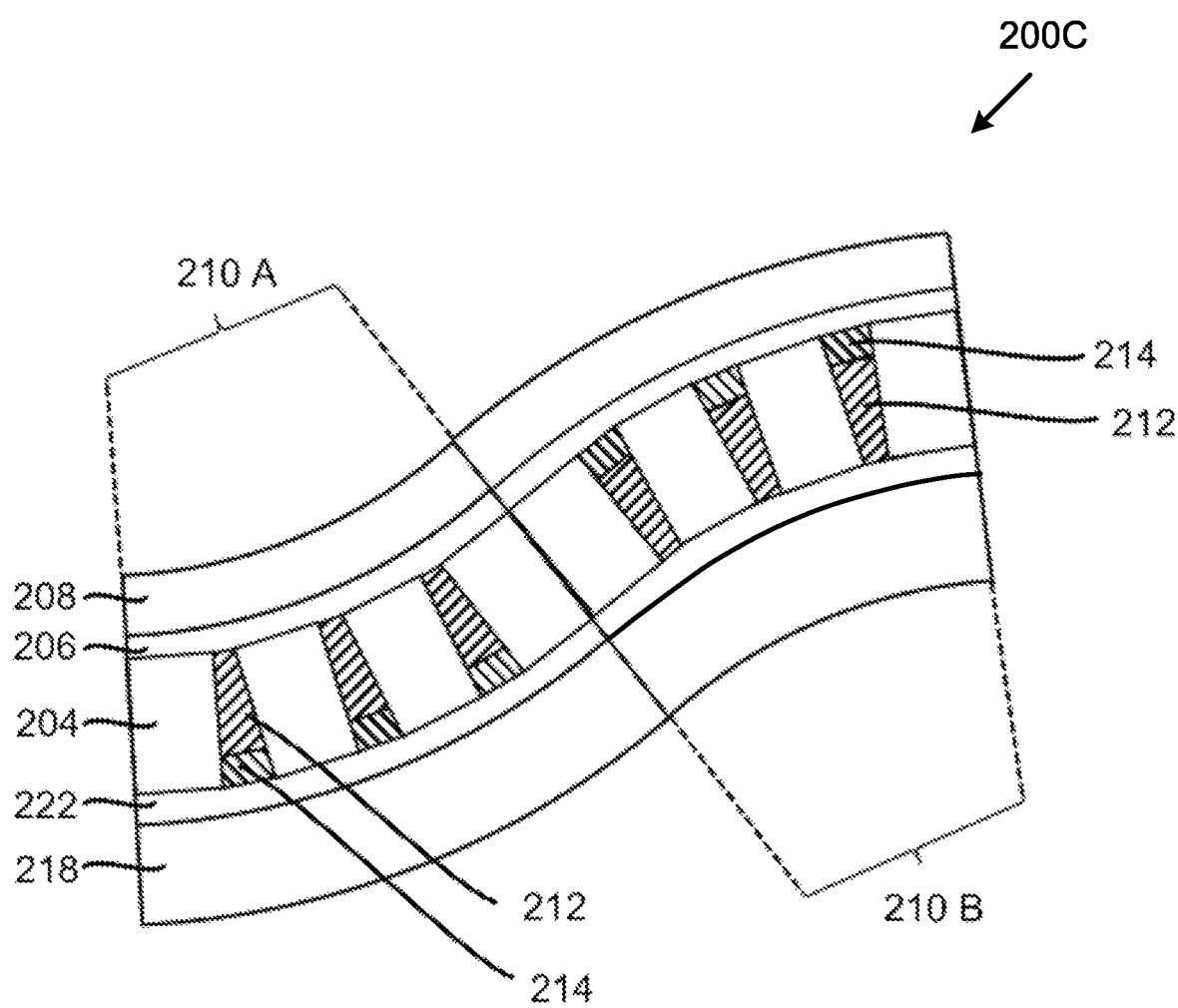
FIG. 2C is a schematic cross-sectional view of the first folding region and the second folding region in FIG. 2B when a curvature is applied to the first folding region and another curvature is applied to the second folding region in accordance with an example implementation of the present disclosure.

FIG. 2C is a schematic cross-sectional view of an example structure 200C of the first and second folding regions of the display device in FIG. 2B in a folding (e.g., closed) state in accordance with an example implementation of the present disclosure. As shown in FIG. 2C, a curvature may be applied to the first folding region 210A such that the display device may be configured to fold inwards (e.g., concave inwards with respect to the outer surface of the outer cover layer 208). Also, another curvature may be applied to the second folding region 210B such that the display device may be configured to fold outwards (e.g., convex outwards with respect to the outer surface of the outer cover layer 208). In one or more implementations of the present disclosure, the example structure 200C of the display device may further include a third non-folding region (not explicitly shown in FIG. 2C) between the first folding region 210A and the second folding region 210B. It should be noted that the number of the folding and non-folding regions and their arrangements can be adjusted to suit the needs of any particular display device, thus are not limited to the example implementations described herein.

Figure 2D:
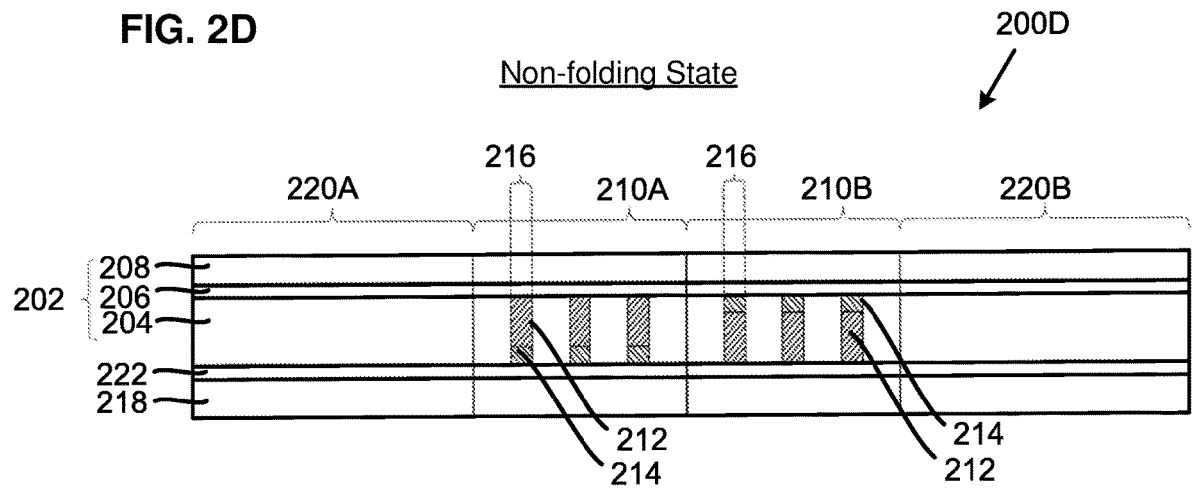
FIG. 2D illustrates a schematic diagram of the display device having the first folding region and the second folding region in a non-folding state in accordance with an example implementation of the present disclosure.
Figure 2E:
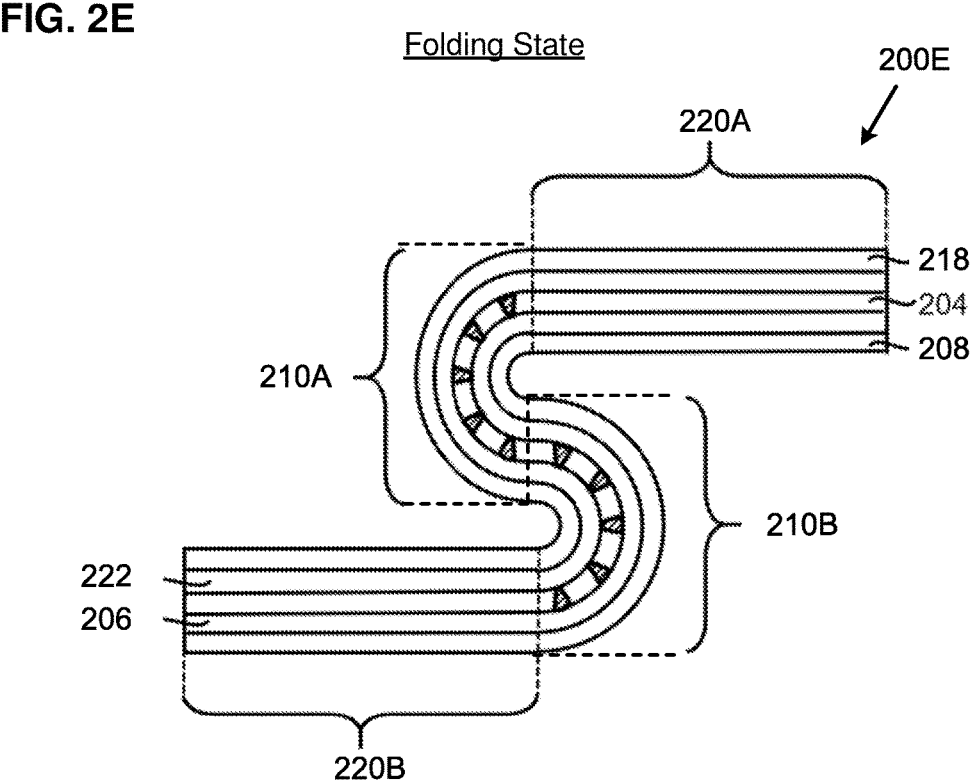
FIG. 2E illustrates a schematic diagram of the display device having the first folding region and the second folding region in a folding state in accordance with an example implementation of the present disclosure.

FIG. 2D illustrates a schematic diagram of an example structure 200D of the display device in FIG. 2A in a non-folding state in accordance with an example implementation of the present disclosure. In FIG. 2D, the example structure 200D includes the display layer 218, the adhesive layer 222, the substrate 204 having openings 216 filled with filler materials (e.g., filler materials 212 and 214), the joining layer 206, and the outer cover layer 208. In the non-folding (e.g., open) state shown in FIG. 2D, for example, the first and second non-folding regions 220A and 220B and the first and second folding regions 210A and 210B of the display device may be planar without curvatures.

FIG. 2E illustrates a schematic diagram of an example structure 200E of the display device in FIG. 2D in a folding (e.g., closed) state in accordance with an example implementation of the present disclosure. In the sample structure 200E of FIG. 2E, the first and second folding regions 210A and 210B receive different curvatures (e.g., applying different bends or folds on the first and second folding regions), where the display device may be folded inwards (e.g., concave inwards with respect to the outer surface of the outer cover layer 208) in the first folding region 210A, and folded outwards (e.g., convex outwards with respect to the outer surface of the outer cover layer 208) in the second folding region 210B. In one or more implementations, the first and second folding regions 210A and 210B can be folded independently.

In one example implementation, the first non-folding region 220A may be folded 180° (e.g., in the clockwise direction) towards the second non-folding region 220B from the non-folding state, where the display device is folded inwards (e.g., concave inwards with respect to the outer surface of the outer cover layer 208) in the first folding region 210A and with no curvature in the second folding region 210B. In another example implementation, the second non-folding region 220B may be folded 180° (e.g., in the clockwise direction) towards the first non-folding region 220A from the non-folding state, where the display device is folded outwards (e.g., convex outwards with respect to the outer cover layer 208) in the second folding region 210B and with no curvature in the first folding region 210A. In yet another example implementation, the display device may be folded such that the angle between the non-folding regions 120A and 120B can be between 0° and 360°.

Figure 3:
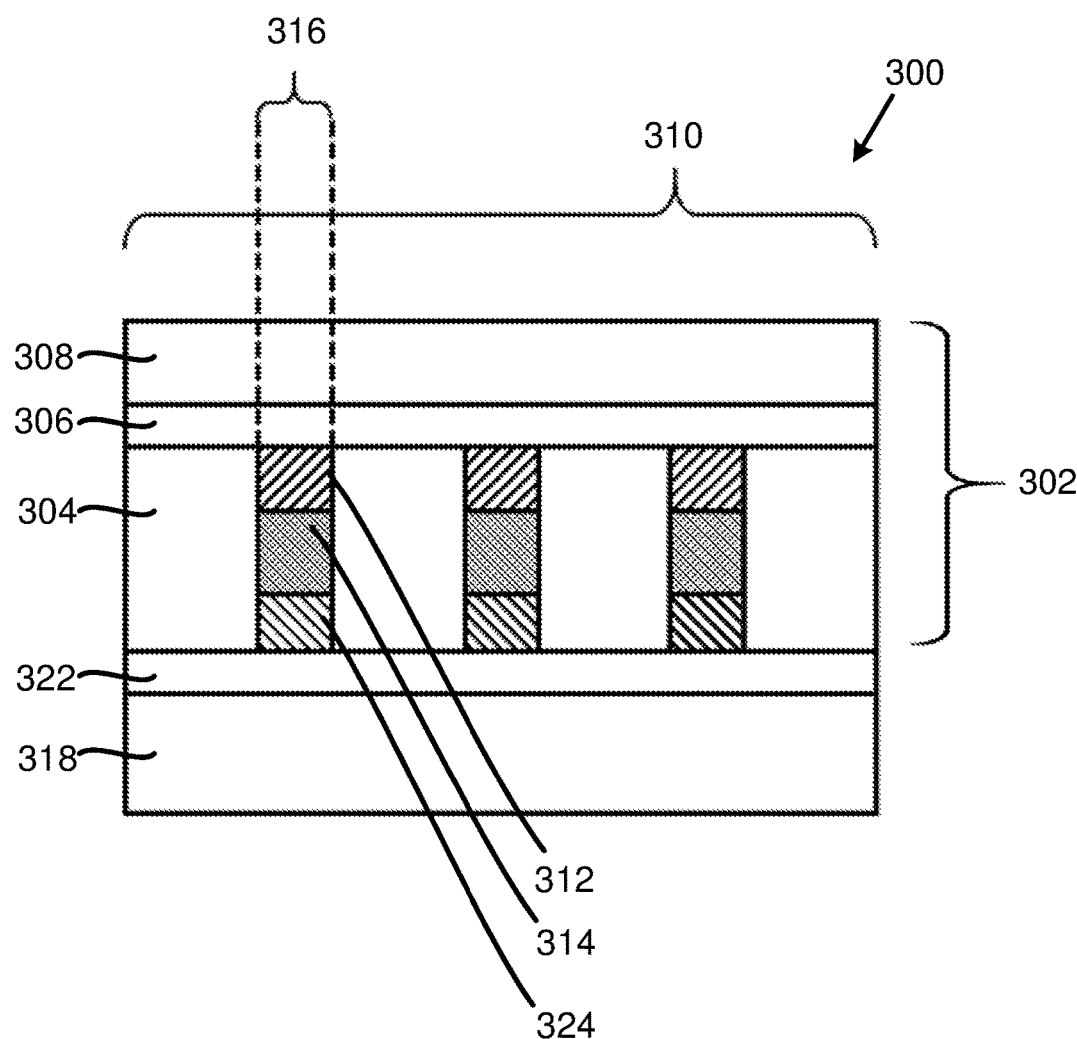
FIG. 3 is a schematic cross-sectional view of a folding region of a display device having three filler materials in accordance with an example implementation of the present disclosure.

FIG. 3 is a schematic cross-sectional view of an example structure 300 of a folding region of a display device in accordance with an example implementation of the present disclosure. The display device may include a cover window 302 having a substrate 304, a joining layer 306, and an outer cover layer 308, where the cover window 302 is disposed on a display layer 318 through an adhesive layer 322.

It should be noted that the display layer 318, the adhesive layer 322, and the cover window 302 having the substrate 304, the joining layer 306, and the outer cover layer 308 described with reference to FIG. 3 may substantially correspond to the display layer 118, the adhesive layer 122, and the cover window 102 having the substrate 104, the joining layer 106, and the outer cover layer 108, respectively, described with reference to FIGS. 1A through 1F. Thus, the details the display layer 318, adhesive layer 322, the cover window 302 including the substrate 304, the joining layer 306, and the outer cover layer 308 are omitted for brevity.

In the present implementation, in the folding region 310, the substrate 304 may include openings 316 that may be filled with a first filler material 312, a second filler material 314, and a third filler material 324. The first filler material 312 and third filler material 324 may have stiffness lower than the second filler material 314. The second filler material 314 may be disposed between the first filler material 312 and third filler material 324 in the openings 316.

In one example implementation, the first filler material 312 and the third filler material 324 may be substantially the same as the first filler material 112 described with reference to FIGS. 1A through 1F. In one example implementation, the second filler material 314 may be substantially the same as the second filler material 114 described with reference to FIGS. 1A through 1F. Thus, the details (e.g., the optical transparency, refractive index, Young's Modulus (e.g., stiffness), suitable material, etc.) of the first filler material 312, the second filler material 314, and the third filler material 324 are omitted for brevity.

With the first, second, and third filler materials 312, 314, and 324 in the openings 316, the example structure 300 is configured to be folded both inwards (e.g., concave with respect to the outer surface of the outer cover layer 308) and outwards (e.g., convex with respect to the outer surface of the outer cover layer 308) in the folding region 310.

It should be noted that the folding region 310 may be implemented in the display device shown in FIGS. 1A through 1F in place of (e.g., to replace) the folding region 110, or in the display device shown in FIGS. 2A through 2E in place of (e.g., to replace) the first folding region 210A and/or the second folding region 210B.

FIGS. 4A, 4B, 4C, and 4D illustrate schematic diagrams of example shapes of openings in a folding region of a substrate in accordance with various example implementations of the present disclosure. In one or more implementations of the present disclosure, the openings in the substrate are configured such that at least one of the openings does not terminate with vertices having angles less than 90°.

Figures 4A, 4B:
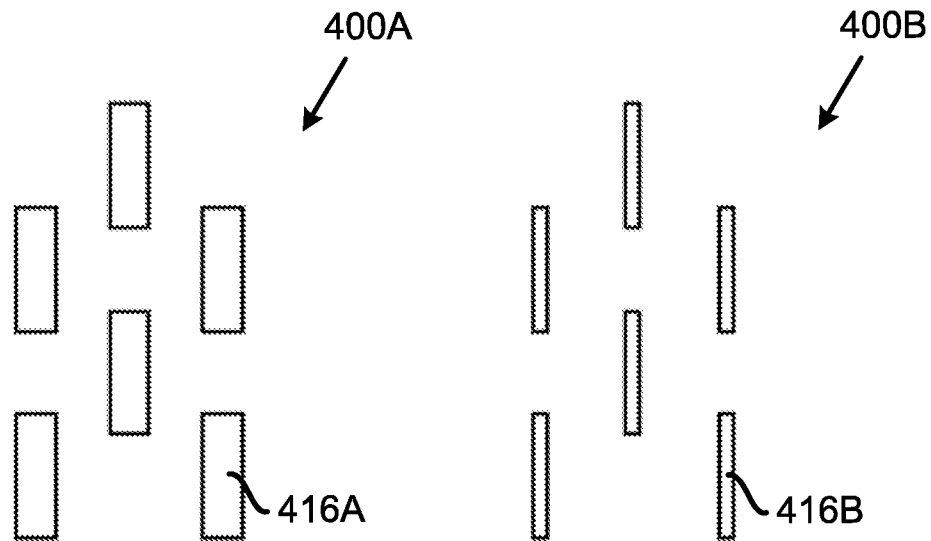
FIGS. 4A, 4B, 4C, and 4D illustrate schematic diagrams of example shapes of openings in a folding region of a substrate in accordance with various example implementations of the present disclosure.
Figures 4C, 4D:
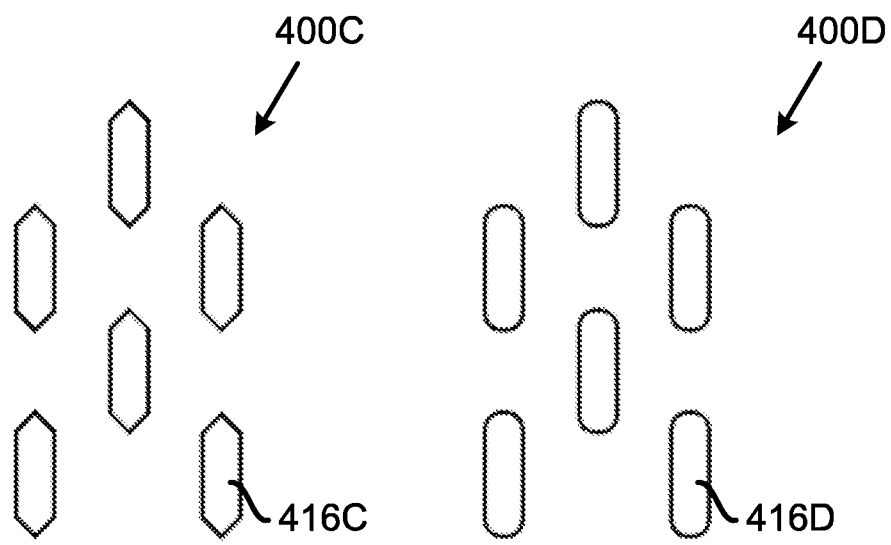

In diagram 400A of FIG. 4A, the openings 416A may each have a wide rectangular shape. In diagram 400B of FIG. 4B, the openings 416B may each have a rectangular shape that is elongated in a longitudinal direction. In diagram 400C of FIG. 4C, the openings 416C may each have a hexagonal shape. In diagram 400D of FIG. 4D, the openings 416D may each have a rectangular shape with rounded corners. In another implementation, the rectangular openings may be elongated in a traverse direction perpendicular to the longitudinal direction. The shape of the openings is not limited to the example implementations of the present disclosure.

Among other advantages of the present disclosure, the openings with the configuration above may reduce nucleation of cracks in the substrate as compared to openings with vertices with smaller angles. This is particularly important for supressing damage to the substrate during impact on the outer cover. The openings with the configuration above, among other advantages, may include facilitating insertion of the first and second filler materials into the openings without voids which may cause scattering of light emitted from the display layer as light propagates through the substrate or the filler materials, thus increasing manufacturing yield. In one or more implementations of the present disclosure, the preferred widths of the openings may range from 5 μm to 100 μm, the preferred lengths of the openings may range from 50 μm to 1000 μm, and the preferred spacing between each opening is between 50 μm and 200 μm. The width of an opening is a dimension measured along a direction between a first non-folding region and a second non-folding region (e.g., the horizontal direction as drawn in FIGS. 4A, 4B, 4C, and 4D), and the length of an opening is a dimension measured along a direction perpendicular to the direction between the first non-folding and the second non-folding region (e.g., the vertical direction as drawn in FIGS. 4A, 4B, 4C, and 4D).

In one or more implementations of the present disclosure, the openings may be made in a substrate of a cover window via laser ablation but are not limited to the example implementation of the present disclosure.

In one or more implementations of the present disclosure, the first filler material and the second material may have a dielectric constant similar to that of the substrate material. For example, the weighted average of the dielectric constant of the first filler material and the second filler material (e.g., weighted by the ratio of the volume of the first filler material and the second filler material) is within ±20% of the dielectric constant of the substrate material, and preferably within ±10% of the dielectric constant of the substrate material. In one or more implementation of the present disclosure, the substrate is glass and the dielectric constant of the glass substrate may be between 5 and 10, preferably between 6.5 and 7.5. For example, chemically strengthened glass formed using an ion exchange process is suitable for use as the substrate and may have a dielectric constant of approximately 6.8 for frequencies between 10 MHz and 3 GHz. Having the dielectric constants above of the filler materials and the substrate materials, among other advantages, ensure that a projected capacitance touch sensor in the display layer has similar sensitivity in the non-folding region(s) and in the folding region(s). The first filler material and/or the second filler material may comprise particles of a material with a dielectric constant higher than the dielectric constant of the substrate (e.g., $Al_2O_3$, $ZrO_2$) disposed within a matrix of a material with a dielectric constant lower than the dielectric constant of the substrate (e.g., elastomeric material). Particles of $Al_2O_3$, for example, may have dielectric constant of approximately 10, and particles of $ZrO_2$ may have dielectric constant between 10 and 25.

In one or more implementations of the present disclosure, the first filler material (e.g., filler material 112, 212, or 312) may comprise a nanoporous structure which facilitates compressibility of the filler material when a curvature is applied (e.g., change in overall volume). The length scale of the porosity of the nanoporous structure may be less than 1 µm, such that there may not be any significant scattering of light propagating through the filler material. The average refractive index of the filler materials may be similar to or the same as the refractive index of the substrate for any given wavelength of visible light. In one or more implementations of the present disclosure, the second and the third filler materials (e.g., filler material 114, 214, 314, and 324) may also comprise, but are not limited to, the nanoporous structure as described with reference to the first filler material.

In one or more implementations of the present disclosure, the substrate (e.g., substrate 104, 204, or 304) may be pre-stressed (e.g., applying a bend or fold to the substrate with or without filler materials before the display device is assembled) such that the display device of the present disclosure may be configured to exist in two different states. For example, the display device may have a "closed" state in which the folding region of the display device has a first curvature, and an "open" state in which the folding region of the display has a second curvature. The second filler material may be relaxed (has zero stress) for a third curvature, which is in between the first curvature and the second curvature. Preferably the third curvature is approximately midway between the first curvature and the second curvature. The second filler material may be inserted into the substrate when the substrate is 'pre-stressed' to the third curvature such that the second filler material is relaxed for this curvature of the substrate. Similarly, the first filler material may also be configured to be relaxed at a third curvature.

The present disclosure improves upon conventional structures in many facets. For example, when a single type of filler material with low stiffness is used to fill in the openings to facilitate folding, the low stiffness filler material may subject a surface of a cover layer to be susceptible to impact damage from an object. Moreover, when a single type of filler material with high stiffness is used to fill in the openings, the high stiffness filler material may not provide sufficient flexibility that a foldable display requires. In contrast, implementations of the present disclosure provide a cover window that includes at least two different filler materials with a first filler material for flexibility and simultaneously a second filler material for more effective support of the cover layer during impact.

In another example, when a substrate is thinned in localized regions to allow flexibility, the substrate is susceptible to nucleation of cracks at regions where the substrate is thinned. Cracks may nucleate because the substrate material is thin and/or due to surface imperfections associated with the thinning process. When the substrate is a brittle material such as glass, the nucleation may worsen. Once nucleated, cracks may readily propagate throughout the substrate layer during folding of the display or during impact on the outer cover. In contrast, implementations of the present disclosure provide a substrate having openings through the entire thickness of the substrate without a need to reduce the thickness of the substrate, thus removing the possibility of nucleation sites that may lead to cracking.

From the above descriptions, it is manifested that various techniques may be used for implementing the concepts described in the present application without departing from the scope of those concepts. Moreover, while the concepts have been described with specific reference to certain implementations, a person of ordinary skill in the art may recognize that changes may be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

What is claimed is:

1. A cover window for a display device, the cover window comprising:
    an outer cover layer;
    a substrate having a plurality of openings in a folding region of the cover window; and
    a joining layer adjoining the outer cover layer and the substrate;
    wherein at least one of the plurality of openings extends through an entire thickness of the substrate, and is filled with a first filler material having a first stiffness and a second filler material having a second stiffness; and
    wherein the first stiffness is less than the second stiffness, and the second stiffness is less than a stiffness of the substrate,
    the folding region includes an inward folding region and an outward folding region;
    the plurality of openings includes a plurality of inward folding openings in the inward folding region and a plurality of outward folding openings in the outward folding region;
    each of the plurality of inward folding openings includes the first filler material disposed on the second filler material; and
    each of the plurality of outward folding openings includes the second filler material disposed on the first filler material.

2. The cover window of claim 1, wherein:
    the substrate is disposed on a display layer of the display device;
    the first filler material enables easy bending of the cover window; and
    the second filler material provides protection of the display layer during impact on the outer cover layer of the folding region.

3. The cover window of claim 1, wherein at least one of the first filler material and the second filler material includes at least one of:
    elastomers;
    acrylic resin; and
    ultra violet (UV) curable optical adhesives.

4. The cover window of claim 1, wherein the first filler material and the second filler material fill an entire space of the at least one of the plurality of openings.

5. The cover window of claim 1, wherein the first filler material fills 50%-90% of the entire thickness of the substrate.

6. The cover window of claim 1, wherein the second filler material fills 10%-50% of the entire thickness of the substrate.

7. The cover window of claim 1, wherein the joining layer has a stiffness higher than the first stiffness of the first filler material.

8. The cover window of claim 1, wherein:
the first filler material has a first refractive index for a wavelength of visible light;
the second filler material has a second refractive index for the wavelength of visible light; and
each of the first and second refractive indices is within ±10% of a refractive index of the substrate for the wavelength of visible light.

9. The cover window of claim 1, wherein:
the first filler material has a first dielectric constant;
the second filler material has a second dielectric constant; and
a weighted average of the first and second dielectric constants is within ±20% of a dielectric constant of the substrate, the weighted average is weighted by a ratio of a volume of the first filler material and a volume the second filler material.

10. The cover window of claim 1, wherein the at least one of the plurality of openings is further filled with a third filler material having a third stiffness, and the third stiffness is less than the second stiffness.

11. The cover window of claim 10, wherein the second material is disposed between the first filler material and the third filler material in the at least one of the plurality of openings.

12. The cover window of claim 1, wherein:
the display device comprises a closed state in which the folding region of the cover window has a first curvature, and an open state in which the folding region of the cover window has a second curvature; and
the second filler material is configured to have zero stress in a third curvature between the first curvature and the second curvature.

13. The cover window of claim 1, wherein at least one of the plurality of openings in the substrate does not terminate with vertices with angles less than 90°.

14. The cover window of claim 1, wherein the first filler material comprises a nanoporous structure to facilitate compressibility of the first filler material when a curvature is applied.

15. A display device comprising:
a display layer; and
a cover window for the display layer;
wherein the cover window comprises:
an outer cover layer; and
a substrate having a plurality of openings in a folding region of the cover window;
wherein at least one of the plurality of openings extends through an entire thickness of the substrate, and is filled with a first filler material having a first stiffness and a second filler material having a second stiffness different from the first stiffness,
the folding region includes an inward folding region and an outward folding region:
the plurality of openings includes a plurality of inward folding openings in the inward folding region and a plurality of outward folding openings in the outward folding region:
each of the plurality of inward folding openings includes the first filler material disposed on the second filler material; and
each of the plurality of outward folding openings includes the second filler material disposed on the first filler material.

16. The display device of claim 15, wherein the first stiffness is less than the second stiffness, and the second stiffness is less than a stiffness of the substrate.

17. The display device of claim 15, wherein at least one of the first filler material and the second filler material includes at least one of:
elastomers;
acrylic resin; and
ultra violet (UV) curable optical adhesives.

18. The display device of claim 15, wherein:
the first filler material has a first refractive index for a wavelength of visible light;
the second filler material has a second refractive index for the wavelength of visible light; and
each of the first and second refractive indices is within ±10% of a refractive index of the substrate for the wavelength of visible light.

19. The display device of claim 15, wherein:
the first filler material has a first dielectric constant;
the second filler material has a second dielectric constant; and
a weighted average of the first and second dielectric constants is within ±20% of a dielectric constant of the substrate, the weighted average is weighted by a ratio of a volume of the first filler material and a volume the second filler material.

* * * * *